(12) United States Patent
An et al.

(10) Patent No.: US 10,446,815 B2
(45) Date of Patent: Oct. 15, 2019

(54) PACK CASE AND BATTERY PACK COMPRISING SAME

(71) Applicant: LG CHEM, LTD., Seoul (KR)

(72) Inventors: Hyuk An, Daejeon (KR); Seong-Tae Kim, Daejeon (KR); Jun-Yeob Seong, Daejeon (KR); Sang-Yoon Jeong, Daejeon (KR); Yang-Kyu Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 245 days.

(21) Appl. No.: 15/528,917

(22) PCT Filed: Feb. 11, 2016

(86) PCT No.: PCT/KR2016/001406
§ 371 (c)(1),
(2) Date: May 23, 2017

(87) PCT Pub. No.: WO2016/148400
PCT Pub. Date: Sep. 22, 2016

(65) Prior Publication Data
US 2017/0309876 A1  Oct. 26, 2017

(30) Foreign Application Priority Data

Mar. 16, 2015 (KR) ........................ 10-2015-0036090

(51) Int. Cl.
*H01M 2/10* (2006.01)
*H01M 2/26* (2006.01)
*H01M 10/42* (2006.01)

(52) U.S. Cl.
CPC ........... *H01M 2/1083* (2013.01); *H01M 2/10* (2013.01); *H01M 2/1077* (2013.01); *H01M 2/26* (2013.01);

(Continued)

(58) Field of Classification Search
CPC ............ H01M 2/1083; H01M 2/1077; H01M 10/4221; H01M 2/10; H01M 2/26; H01M 10/42

See application file for complete search history.

(56) References Cited

U.S. PATENT DOCUMENTS 9,093,686 B2  7/2015  Lee et al.
9,608,244 B2  3/2017  Shin et al.
(Continued)

FOREIGN PATENT DOCUMENTS

CN    101395737 A    3/2009
JP    2008-270121 A  11/2008
(Continued)

OTHER PUBLICATIONS

International Search Report for PCT/KR2016/001406 dated May 30, 2016.

*Primary Examiner* — Muhammad S Siddiquee
(74) *Attorney, Agent, or Firm* — Birch, Stewart, Kolasch & Birch, LLP

(57) ABSTRACT

The present disclosure discloses a pack case suitable for preventing vibration or deviation of a battery module on a case during an assembly operation, and a battery pack including the same. The pack case according to the present disclosure includes an align unit and a bus bar disposed at an edge on an inner circumferential surface, and a main case having a connection terminal contacting the bus bar on an outer circumferential surface, and the align unit and the bus bar contact a battery module at a periphery of the battery module seated on the inner circumferential surface of the main case.

20 Claims, 6 Drawing Sheets

(52) U.S. Cl.
    CPC ....... *H01M 10/42* (2013.01); *H01M 10/4221* (2013.01)

(56) References Cited

U.S. PATENT DOCUMENTS

| | | | |
|---|---|---|---|
| 10,062,934 B2* | 8/2018 | Obasih | H01M 10/625 |
| 2002/0182480 A1 | 12/2002 | Hanauer et al. | |
| 2009/0305116 A1* | 12/2009 | Yang | H01M 2/0212 |
| | | | 429/61 |
| 2011/0076521 A1* | 3/2011 | Shimizu | H01M 2/1061 |
| | | | 429/7 |
| 2013/0101883 A1 | 4/2013 | Zhao | |
| 2014/0111161 A1 | 4/2014 | Kim | |
| 2015/0037662 A1* | 2/2015 | Pinon | H01M 2/0237 |
| | | | 429/179 |
| 2015/0162648 A1 | 6/2015 | Yang et al. | |
| 2015/0325818 A1* | 11/2015 | Suzuki | H01M 2/1061 |
| | | | 429/159 |

FOREIGN PATENT DOCUMENTS

| | | |
|---|---|---|
| JP | 2009-205986 A | 9/2009 |
| JP | 2010-211950 A | 9/2010 |
| JP | 2011-49014 A | 3/2011 |
| JP | 2011-76936 A | 4/2011 |
| JP | 2013-534360 A | 9/2013 |
| JP | 2014-532958 A | 12/2014 |
| KR | 20-1998-036201 U | 9/1998 |
| KR | 10-2011-0132667 A | 12/2011 |
| KR | 10-2014-0052519 A | 5/2014 |
| KR | 10-2014-0130357 A | 11/2014 |

\* cited by examiner

PACK CASE AND BATTERY PACK COMPRISING SAME

TECHNICAL FIELD

The present application claims the benefit of Korean Patent Application No. 10-2015-0036090 filed on Mar. 16, 2015 with the Korean Intellectual Property Office, the disclosure of which is incorporated herein by reference in its entirety.

The present disclosure relates to a pack case suitable for accommodating a component safely to prevent vibration of a part and/or deviation of the part during assembly operation, and for delivering electrical characteristics of the component to an external electric device uniformly, and a battery pack comprising the same.

BACKGROUND ART

Recently, vehicles are manufactured based on studies conducted to secure driving force using internal combustion engines and/or electric motors, in order to reduce air pollution from exhaust gas of vehicles. Accordingly, the vehicles have evolved in the order of hybrid vehicles, plug-in hybrid vehicles and electric vehicles. In this case, the hybrid vehicles and plug-in hybrid vehicles have an internal combustion engine, an electric motor and a battery pack, and the electric vehicles have an electric motor and a battery pack, but not an internal combustion engine.

Accordingly, the battery pack has evolved together with hybrid vehicles, plug-in hybrid vehicles and electric vehicles. The battery pack is configured to be charged externally from the electric vehicles. The battery pack has a pack case and a battery module, and the pack case comprises a lower case and an upper case, thereby encasing the battery module. The battery module has battery cells and cartridges between end plates. In this case, movement of the battery module is restricted inside the pack case by an inner shape of the lower case or the upper case.

However, the inner shape fills inner space of the pack case at a side portion of the battery module, and thus prevents vibration of a component during and after an assembly operation of the battery pack in the lower case or the upper case, but has a structure that is vulnerable to the vibration of the component between the lower case and the upper case. Further, when having a shallow accommodating depth of the battery module in the lower case or the upper case, the inner shape cannot prevent deviation of the component from the lower case or the upper case during an assembly operation.

Therefore, numerous studies for preventing vibration of a component and/or deviation of the component during and after an assembly operation of the battery pack are being conducted. One example of the above studies is disclosed in 'BATTERY PACK HAVING A COMPACT STRUCTURE' of Japanese Patent Application No. 2013-534360 (Laid-open on Sep. 2, 2013). The battery pack has a pack case, a battery module and a pack cover. The pack case accommodates the battery module, and the pack cover covers the battery module on the pack case. Here, the battery module has a lower end plate, a cell module stack and an upper end plate that are stacked sequentially.

The upper end plate has fixated extension members at edges, and the fixated extension members are screw-coupled to the pack cover through screw members. Therefore, the screw-coupling of the fixated extension members and the pack cover enables prevention of vibration of a component during an assembly operation of the battery pack in the pack case or the pack cover and between the pack case and the pack cover. However, the assembly operation of the battery pack requires repeated screw-coupling of the fixated extension members and the pack cover, and thus needs a lot of work hours of operators.

DISCLOSURE

Technical Problem

The present disclosure is designed to solve the problems of the related art, and therefore the present disclosure is directed to providing a pack case suitable for accommodating a battery module safely to prevent vibration and deviation of the battery module during an assembly operation, and for delivering electrical characteristics of the battery module to an external electric device uniformly, and a battery pack comprising the same.

Technical Solution

In one aspect of the present disclosure, there is provided a pack case configured to encase a battery module, the pack case including a main case configured to accommodate a portion of the battery module, and having an align unit disposed at an edge of one direction on an inner circumferential surface, a bus bar disposed at an edge of the other direction on the inner circumferential surface, and a connection terminal contacting the bus bar on an outer circumferential surface, wherein the align unit and the bus bar are disposed at a periphery of the battery module to contact the battery module, the align unit restricts movement of the battery module in the one direction and the other direction, and the bus bar is electrically connected to at least one battery cell of the battery module.

Preferably, the align unit may be formed in a hook shape, and a plurality of said align units may be disposed at the edge of the one direction.

In one aspect, the align unit may be disposed from a central region towards the edge of the inner circumferential surface, protrude to a periphery of the battery module, and extend towards a side wall of the battery module.

In another aspect, the align unit may support the battery module below the battery module, and may have a hook inserted into a groove unit between cartridges of the battery module at a side portion of the battery module.

In yet another aspect, at least one pair of said align units may be disposed to face each other at the edge of the one direction on the inner circumferential surface.

Here, a plurality of said align units may be disposed in different shapes from one another along the edge of the one direction on the inner circumferential surface.

According to the present disclosure, the bus bar may protrude from the main case towards the battery module, and a plurality of said bus bars may be disposed at the edge of the other direction.

Preferably, a pair of said bus bars may be disposed to face each other at the edge of the other direction on the inner circumferential surface.

In one aspect, a plurality of said bus bars may be disposed in different shapes from one another along the edge of the other direction on the inner circumferential surface.

Meanwhile, the main case may include a handle configured to move the pack case on the outer circumferential surface.

According to the present disclosure, the pack case may further include a sub-case configured to cover a rest of the battery module and disposed on the case, and the sub-case may surround the bus bar.

In another aspect of the present disclosure, there is provided a battery pack including: a battery module and an electric device component arranged sequentially and electrically connected to each other; and a main case and a sub-case configured to encase the battery module and the electric device component, wherein the main case includes align units disposed to face each other in one direction at an edge of an inner circumferential surface and hook-coupled to the battery module, and bus bars disposed to face each other in the other direction and each contacting each of alternative electrode terminals of an ICB assembly of the battery module, and covers a printed circuit board of the ICB assembly facing the inner circumferential surface, and the bus bar is welded to one of the alternative electrode terminals.

According to the present disclosure, the battery module may include battery cells and cartridges between end plates, and the ICB assembly at a lower portion, and the alternative electrode terminals may contact electrode terminals each disposed at each of distal ends of a serial circuit or a parallel circuit of the battery cells on the end plates.

Preferably, each of the align units may be exposed from the battery module below the battery module, and may have a hook inserted into a groove unit between two cartridges at a periphery of the battery module.

In one aspect, the align units may extend from the edge towards a central region in the main case such that they alternate with each other.

In another aspect, the align units may have different shapes from one another at an edge of one side and at an edge of the other side in the main case.

According to the present disclosure, the bus bars may have different shapes from one another at an edge of one side and at an edge of the other side in the main case.

Preferably, the bus bars may be welded to the alternative electrode terminal of a plate shape at an edge of one side, and may be screw-coupled to the alternative electrode terminal of a cylindrical shape having a screw-line at an edge of the other side.

According to the present disclosure, the alternative electrode terminals may penetrate the electric device component on an end plate of one side portion of the battery module, and may be disposed on an end plate of the other side portion of the battery module.

According to the present disclosure, the printed circuit board may electrically connect the alternative electrode terminals.

According to the present disclosure, the main case and the sub-case may form one pack case.

Preferably, the main case may include connection terminals each electrically connected to the bus bars on an outer circumferential surface, a handle configured to move the pack case, and a connector configured to electrically connect at least one of the ICB assembly and the electric device component to an electric device outside the pack case.

Preferably, the sub-case may surround the alternative terminals and the bus bar, and cover the battery module and the electric device component.

Advantageous Effects

The pack case according to the present disclosure hook-couples the battery module to a main case using align units of hook shapes disposed in one direction at an edge of the main case, in order to assemble the battery pack, and may thus prevent vibration of the battery module during the assembly operation of the battery pack in the main case.

The pack case according to the present disclosure screw-couples and welds terminals of the battery module to bus bars disposed in the other direction at the edge of the main case using the bus bars, during the assembling of the battery pack, in order to encase the battery module with the main case and the sub-case, and may thus prevent deviation of the battery module from the main case.

The battery pack according to the present disclosure accommodates the battery module safely using the align units and the bus bars of the pack case, and may thus prevent vibration between the main case and the sub-case, minimize the work hours of assembling operators, and deliver the electrical characteristics of the battery module to an electric device disposed outside the pack case uniformly.

DESCRIPTION OF DRAWINGS

The accompanying drawings illustrate a preferred embodiment of the present disclosure and together with the detailed descriptions below, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the embodiments disclosed hereinafter, a battery cell refers to a lithium secondary battery. The lithium secondary battery as used herein encompasses a secondary battery in which lithium ions act as operating ions and thereby inducing electrochemical reaction in a positive electrode and a negative electrode during charging and discharging. However, the present disclosure is obviously not limited to the types of batteries.

Figure 1:
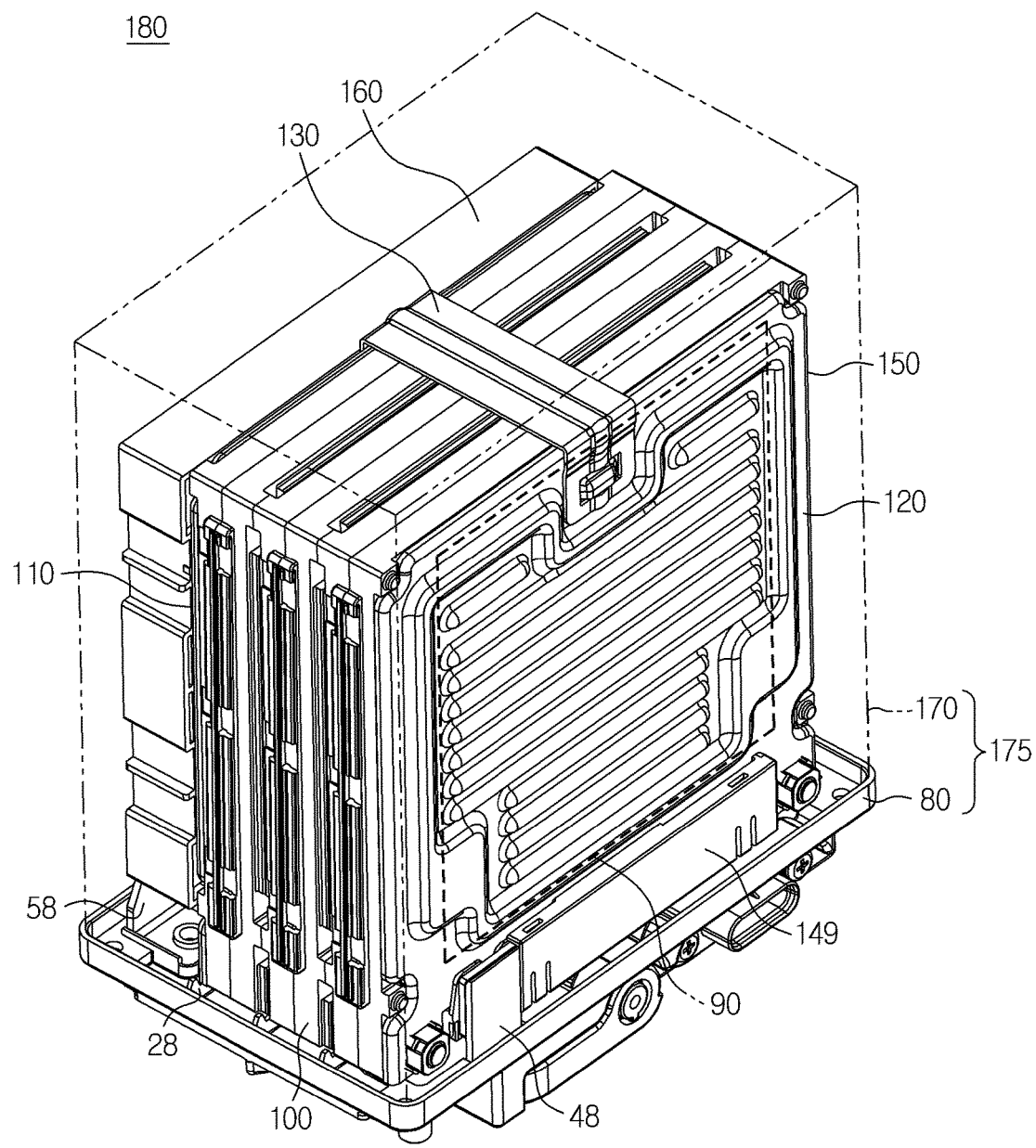
FIG. 1 is a perspective view illustrating a battery pack according to an embodiment of the present disclosure.

FIG. 1 is a perspective view illustrating a battery pack according to an embodiment of the present disclosure.

Referring to FIG. 1, the battery pack 180 according to the present disclosure includes a battery module 150, an electric device component 160 and a pack case 175. The battery module 150 include cartridges 100, end plates 110, 120 and an interconnect board (ICB) assembly 149. The cartridges 100 are arranged sequentially inside the pack case 175. Preferably, each of the cartridges 100 accommodates at least one battery cell 90.

The end plates 110, 120 are each disposed at either side portion of the cartridges 100. Preferably, the end plates 110, 120 are closely adhered and fastened together with the cartridges 100 by a clamp 130. The ICB assembly 149 is disposed at a lower portion of the end plate 120. Preferably, the ICB assembly 149 electrically connects the battery cells 90 of the cartridges 100 through a printed circuit board 144 in FIG. 6.

The electric device component 160 is electrically connected to the battery module 150 on the end plate 110. Preferably, the electric device component 160 includes a battery management system (BMS), a relay element and a fuse element. The pack case 175 includes a main case 80 and a sub-case 170. The main case 80 has align units 28 (38 in FIG. 2) in one direction, and bus bars 48, 58 in the other direction, at an edge.

Preferably, the align units 28, 38 and the bus bars 48, 58 restrict movement of the battery module 150 in the one direction and in the other direction. The sub-case 170 surrounds the bus bars 48, 58 and the ICB assembly 149 on the main case 80 and covers the battery module 150 and the electric device component 160.

Figure 2:
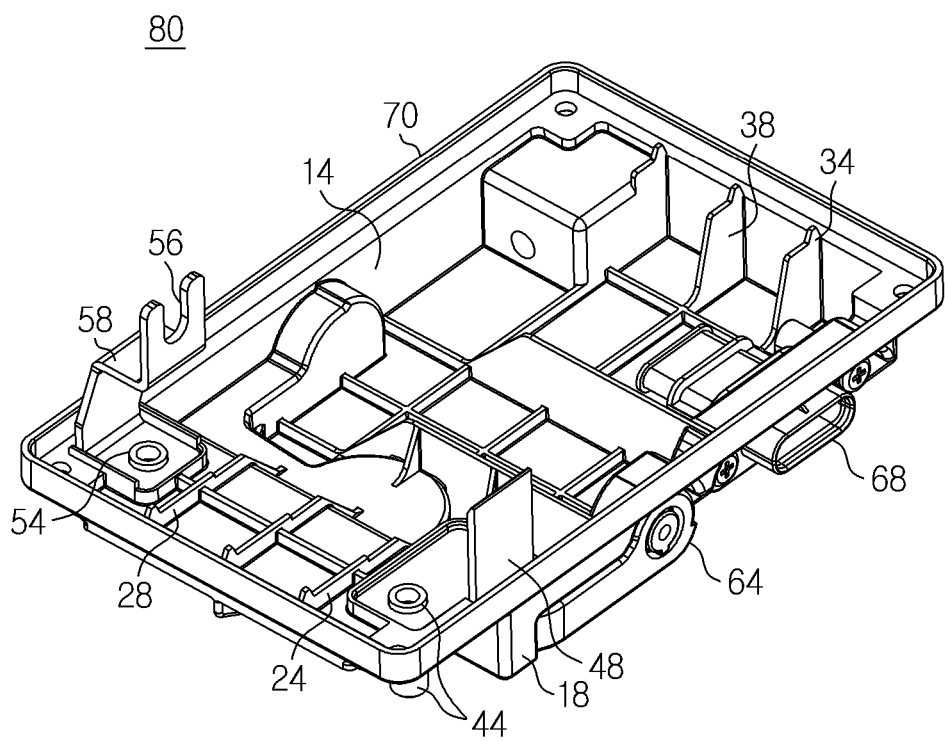
FIG. 2 is a perspective view illustrating a main case in FIG. 1.

FIG. 2 is a perspective view illustrating the main case in FIG. 1.

Referring to FIG. 2, in the pack case 175, the main case 80 accommodates a portion of the battery module 150 through the housing 70 as illustrated in FIG. 1. The main case 80 includes the align units 28, 38 disposed at an edge of one direction on an inner circumferential surface 14 of the housing 70, and the bus bars 48, 58 disposed at an edge of the other direction on the inner circumferential surface 14.

The align units 28, 38 and the bus bars 48, 58 are disposed at a periphery of the battery module 150 to contact the battery module 150. The align units 28, 38 extend from a central region towards an edge of the inner circumferential surface 14. Preferably, the align units 28, 38 extend from an edge towards a central region in the main case 80 such that they alternate with each other.

In one aspect, each of the align units 28, 38 has a hook 24 or 28 at a periphery of the edge of the inner circumferential surface. In another aspect, the align units 28, 38 are disposed to face each other at an edge of one direction on the inner circumferential surface 14. In another aspect, the align units 28, 38 are disposed in different shapes from each other along the edge of the one direction on the inner circumferential surface 14.

The bus bars 48, 58 are disposed to face each other on the inner circumferential surface 14. The bus bars 48, 58 are disposed in different shapes from each other on the inner circumferential surface 14. More specifically, the bus bar 48 protrudes straightly from the housing 70 towards an upper portion of the housing 70 in a flat shape, and is fixated to the housing 70 such that it occupies a certain surface area of the housing 70 in a region of the housing 70.

Further, the bus bar 58 protrudes from the housing 70 towards the upper portion of the housing 70 such that it is bent numerous times in a flat shape, and is fixated to the housing 70 such that it occupies a certain surface area of the housing 70 in the other region of the housing 70. The bus bar 58 has a concave "U" portion at a front end in an upper portion. Meanwhile, the main case 80 includes connection terminals 44, 54, a handle 64 and a connector 68 on an outer circumferential surface 18 of the housing 70.

The connection terminals 44, 54 penetrate the housing 70 to contact the bus bars 48, 58. The handle 64 is formed as a handle to move the pack case 175, for example, the battery pack 180 in FIG. 1. The connector 68 is configured to electrically connect the ICB assembly 149 and/or the electric device component 160 in FIG. 1 to an electric device (not illustrated in the drawings) outside the pack case 180.

Figure 3:
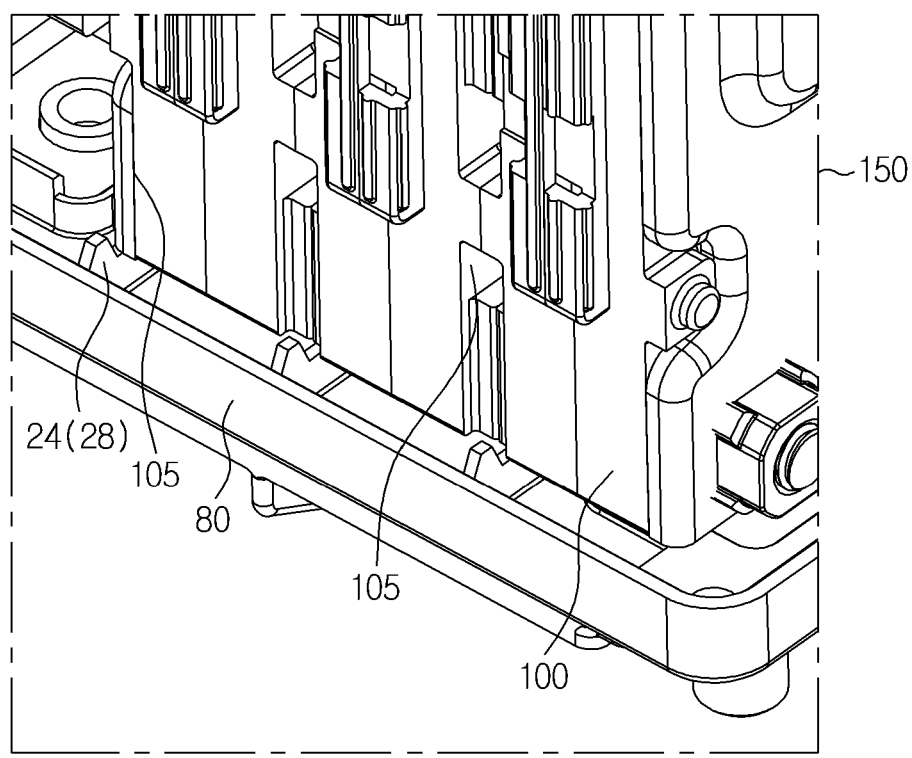
FIG. 3 is a partial perspective view illustrating in detail a battery module coupled to align units of the main case in FIG. 1.

FIG. 3 is a partial perspective view illustrating in detail the battery module coupled to the align units of the main case in FIG. 1.

Referring to FIG. 3, after the battery module 150 is seated on the main case 80, the battery module 150 is disposed between the align units 28 (38 in FIG. 2). More specifically, the align units 28, 38 are disposed from the central region towards an edge of the inner circumferential surface 14, and considering FIG. 1 and FIG. 2, protrude to a periphery of the battery module 150 and extend towards a side wall of the battery module 150.

Preferably, the align units 28, 38 support the battery module 150 below the battery module 150, and are exposed from the battery module 150. Here, the align units 28, 38 restrict movement of the battery module 150 in one direction and the other direction. For this purpose, the align units 28, 38 are formed in hook shapes. That is, each of the align units 28, 38 has a hook 24 or 34 that is inserted into a groove unit 105 between the cartridges 100 of the battery module 150 at a side portion of the battery module 150.

The hook 24 or 34 has a substantially triangular shape. The hook 24 or 34 contacts the cartridges 100 through the groove unit 105 and restricts movement of the battery module 150.

Figure 4:
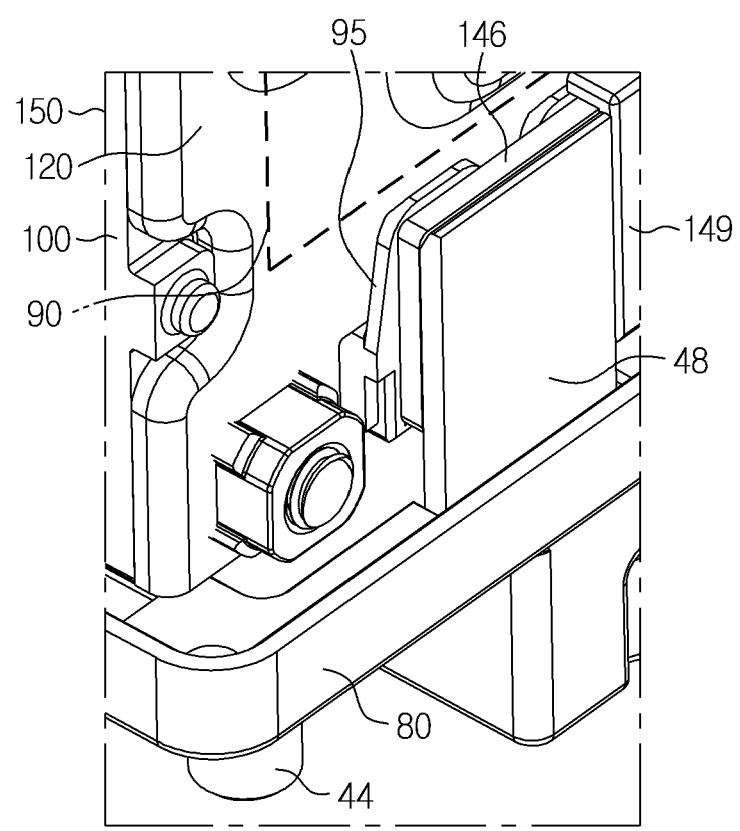
FIG. 4 is a partial perspective view illustrating in detail the battery module coupled to a bus bar of the main case in FIG. 1.
Figure 5:
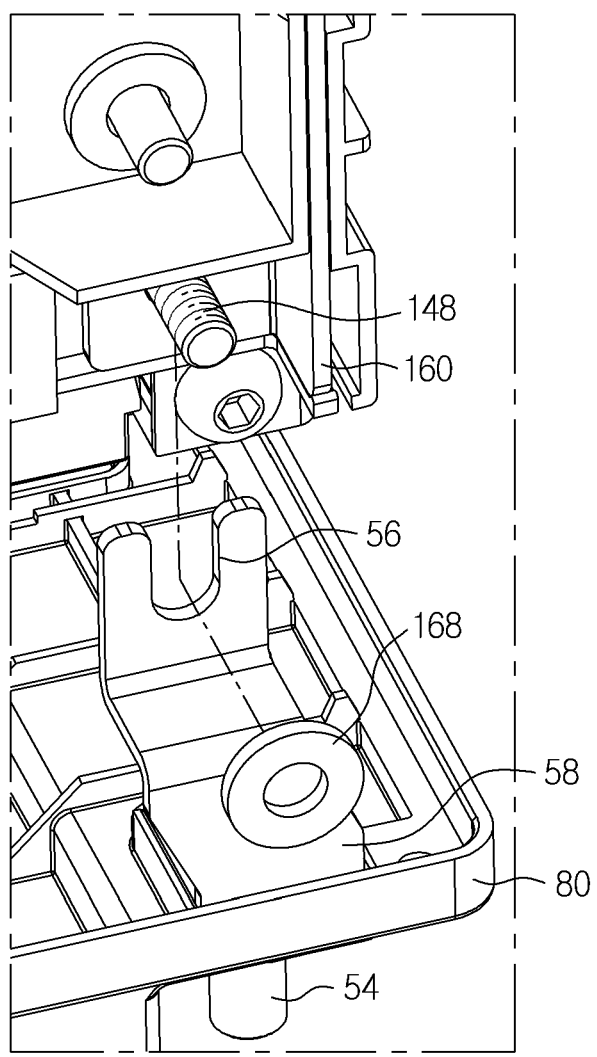
FIG. 5 is an exploded perspective view illustrating in detail a portion of an electric device component coupled to the bus bar of the main case in FIG. 1.

FIG. 4 is a partial perspective view illustrating in detail the battery module coupled to the bus bar of the main case in FIG. 1, and FIG. 5 is an exploded perspective view illustrating in detail a portion of the electric device component coupled to the bus bar of the main case in FIG. 1.

Referring to FIG. 4 and FIG. 5, in the battery module 150, the battery cells 90 have electrode terminals 95 each disposed at each of distal ends of a serial circuit or a parallel circuit through the cartridges 100. The electrode terminals 95 protrude from the end plates 110, 120 as in FIG. 4. Here, the electrode terminals 95 contact alternative electrode terminals 146, 148 of the ICB assembly 149 disposed at a lower portion of the battery module 150, as in FIG. 4 and FIG. 5.

By the coupling of the battery module 150 and the main case 80, one 146 of the alternative electrode terminals 146, 148 is formed in a plate shape, and contacts the bus bar 48 of the main case 80 in a surface-to-surface manner as in FIG. 4. More specifically, the bus bar 48 is closely adhered and welded to the alternative electrode terminal 148. Further, the remaining one 148 of the alternative electrode terminals 146, 148 is formed in a cylindrical shape, penetrates the electric device component 160, and protrudes from the electric device component 160 as in FIG. 5.

The alternative electrode terminal 148 may be fitted to the concave unit 56 disposed at the front end of the bus bar 58 of the main case 80 as in FIG. 5. Preferably, the alternative electrode terminal 148 has a screw line. The alternative electrode terminal 148 may be screw-coupled to a nut 168 in the concave unit 56 of the bus bar 58 of the main case 80 as in FIG. 5.

Figure 6:
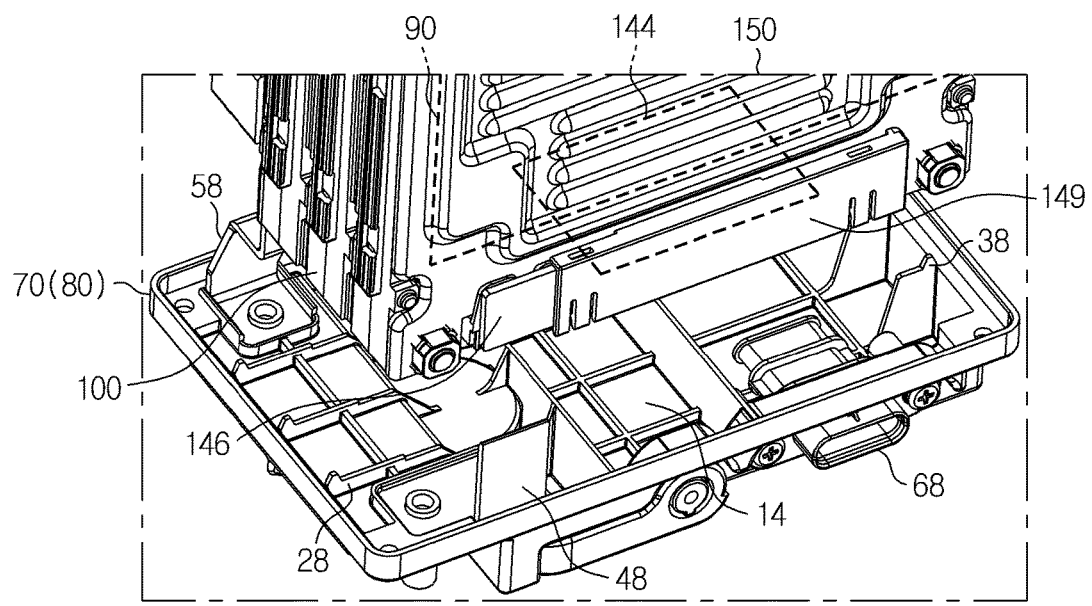
FIG. 6 and FIG. 7 are perspective views provided to explain a method for manufacturing the battery pack in FIG. 1 and an operating mechanism thereof.
Figure 7:
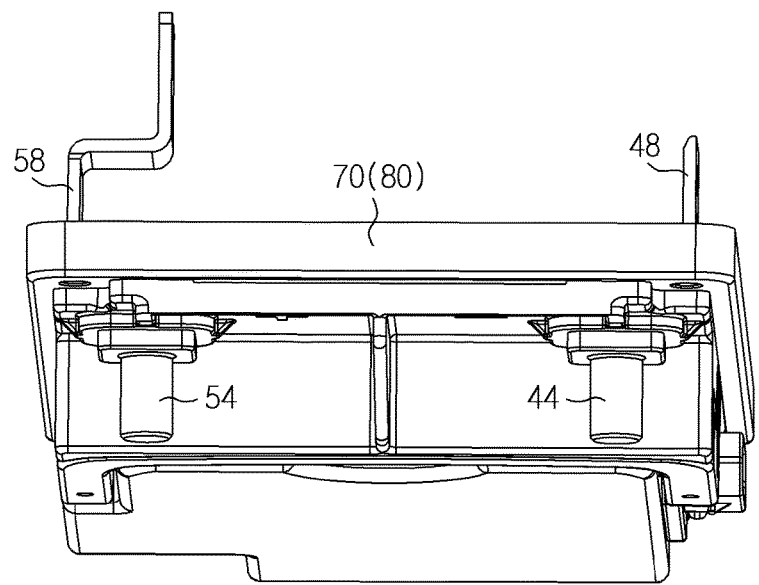

FIG. 6 and FIG. 7 are perspective views provided to explain a method for manufacturing the battery pack in FIG. 1 and an operating mechanism thereof.

Referring to FIG. 6, the main case 80 and the battery module 150 may be prepared. The main case 80 may have the align units 28, 38 and the bus bars 48, 58 on the inner circumferential surface 14 in the housing 70. The align units 28, 38 and the bus bars 48, 58 may be disposed in one direction and in the other direction at the edge of the inner circumferential surface 14 of the main case 80. The battery module 150 may be seated on the inner circumferential surface 14 of the main case 80.

Preferably, the battery module 150 may be arranged between the align units 28, 38 and the bus bars 48, 58 on the inner circumferential surface 14 of the main case 80. More specifically, the battery module 150 is arranged between the align units 28, 38 in one direction, and may be arranged between the bus bars 48, 58 in the other direction. Here, the coupling relation of the main case 80 and the battery module 150 was already explained with reference to FIG. 1, and FIGS. 3 to 5.

After the battery module 150 is seated on the main case 80, the electric device component 160 may be arranged on the main case 80. Preferably, the electric device component 160 may be disposed at a side portion of the battery module 150 on the main case 80, and may be electrically connected to the battery module 150. Next, the sub-case 170 in FIG. 1 may be arranged on the main case 80. The sub-case 170 may cover the battery module 150 and the electric device component 160 on the main case 80.

The main case 80 and the sub-case 170 form the pack case 175, and the pack case 175 may form the battery pack 180 in FIG. 1 together with the battery module 150 and the electric device component 160. Meanwhile, in the battery pack 180, the battery module 150 may have the ICB assembly 149 at a lower portion. The ICB assembly 149 may have the printed circuit board 144 and the alternative electrode terminals 146 (148 in FIG. 5).

The printed circuit board 144 may be fixated to the battery module 150, and face the inner circumferential surface 14 of the main case 80. The printed circuit board 144 may electrically connect the alternative electrode terminals 146, 148.

Referring to FIG. 6 and FIG. 7, the battery module 150 may receive application of power from outside through the connector 68 of the pack case 175, and current characteristics and voltage characteristics of the battery cells 90 of the battery module 150 may be delivered to the electric device component 160 through the printed circuit board 144 and the alternative electrode terminals 146, 148, and the electric device component 160 may deliver a uniform magnitude of current of the battery cells 90 to the electric device (not illustrated in the drawings) disposed outside of the pack case 175 through the connection terminals 44, 54 in FIG. 7 of the pack case 175.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A pack case configured to encase a battery module, the pack case comprising:
   a main case configured to accommodate a portion of the battery module, and having an align unit disposed at an edge of one direction on an inner circumferential surface, a bus bar disposed at an edge of the other direction on the inner circumferential surface, and a connection terminal contacting the bus bar on an outer circumferential surface, wherein the align unit and the bus bar are disposed at a periphery of the battery module to contact the battery module, the align unit restricts movement of the battery module in the one direction and the other direction, and the bus bar is electrically connected to at least one battery cell of the battery module.

2. The pack case of claim 1, wherein the align unit is formed in a hook shape and a plurality of said align units are disposed at the edge of the one direction.

3. The pack case of claim 1, wherein the align unit is disposed from a central region towards the edge of the inner circumferential surface, protrudes to a periphery of the battery module, and extends towards a side wall of the battery module.

4. The pack case of claim 1, wherein the align unit supports the battery module below the battery module, and has a hook inserted into a groove unit between cartridges of the battery module at a side portion of the battery module.

5. The pack case of claim 1, wherein at least one pair of said align units are disposed to face each other at the edge of the one direction on the inner circumferential surface.

6. The pack case of claim 1, wherein a plurality of said align units are disposed in different shapes from one another along the edge of the one direction on the inner circumferential surface.

7. The pack case of claim 1, wherein the bus bar protrudes from the main case towards the battery module, and a plurality of said bus bars are disposed at the edge of the other direction.

8. The pack case of claim 1, wherein a pair of said bus bars are disposed to face each other at the edge of the other direction on the inner circumferential surface.

9. The pack case of claim 1, wherein a plurality of said bus bars are disposed in different shapes from one another along the edge of the other direction on the inner circumferential surface.

10. The pack case of claim 1, wherein the main case comprises a handle configured to move the pack case on the outer circumferential surface.

11. The pack case of claim 1 further comprising a sub-case configured to cover a rest of the battery module and disposed on the case, wherein the sub-case surrounds the bus bar.

12. A battery pack comprising:
   a battery module and an electric device component arranged sequentially and electrically connected to each other; and
   a main case and a sub-case configured to encase the battery module and the electric device component, wherein the main case comprises align units disposed to face each other in one direction at an edge of an inner circumferential surface and hook-coupled to the battery module, and bus bars disposed to face each other in the other direction and each contacting each of alternative electrode terminals of an ICB assembly of the battery module, and covers a printed circuit board of the ICB assembly facing the inner circumferential surface, and the bus bar is welded to one of the alternative electrode terminals.

13. The battery pack of claim 12, wherein the battery module comprises battery cells and cartridges between end plates, and the ICB assembly at a lower portion, and the alternative electrode terminals contact electrode terminals each disposed at each of distal ends of a serial circuit or a parallel circuit of the battery cells on the end plates.

14. The battery pack of claim 12, wherein each of the align units is exposed from the battery module below the battery module, and has a hook inserted into a groove unit between two cartridges at a periphery of the battery module.

15. The battery pack of claim 12, wherein the align units extend from the edge of the main case towards a central region such that they alternate with each other.

16. The battery pack of claim 12, wherein the align units have different shapes from one another at an edge of one side and at an edge of the other side in the main case.

17. The battery pack of claim 12, wherein the bus bars have different shapes from one another at an edge of one side and at an edge of the other side in the main case.

18. The battery pack of claim 12, wherein the bus bars are welded to the alternative electrode terminal of a plate shape at an edge of one side, and are screw-coupled to the alternative electrode terminal of a cylindrical shape having a screw-line at an edge of the other side.

19. The battery pack of claim 12, wherein the alternative electrode terminals penetrate the electric device component on an end plate of one side portion of the battery module, and is disposed on an end plate of the other side portion of the battery module.

20. The battery pack of claim 12, wherein the printed circuit board electrically connects the alternative electrode terminals.

* * * * *